P. SHAW.
Apparatus for Separating Cream from Milk.
No. 207,822. Patented Sept. 10, 1878.
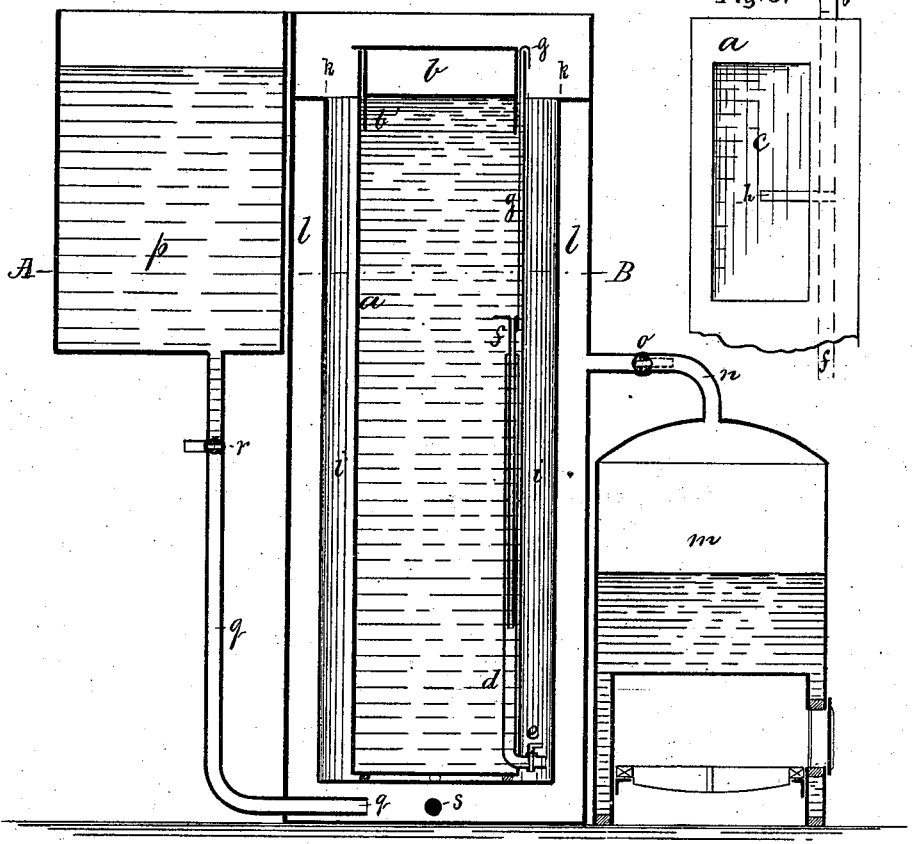
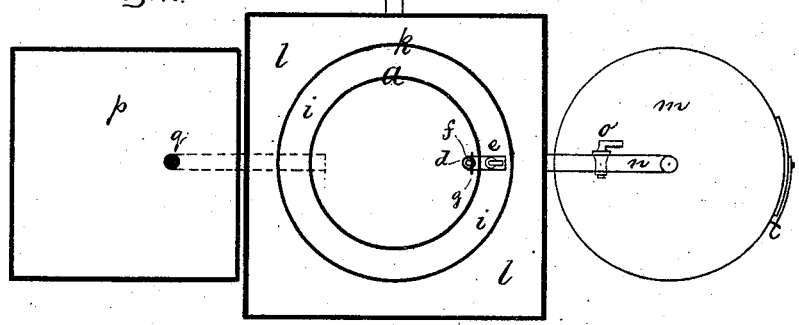
Witnesses:
Willis E. Flint.
Henry Chadbourne.
Inventor:
Philander Shaw,
by Allan Andrén.
his atty.

UNITED STATES PATENT OFFICE.

PHILANDER SHAW, OF BOSTON, MASSACHUSETTS.

IMPROVEMENT IN APPARATUS FOR SEPARATING CREAM FROM MILK.

Specification forming part of Letters Patent No. 207,822, dated September 10, 1878; application filed February 4, 1878.

*To all whom it may concern:*

Be it known that I, PHILANDER SHAW, of Boston, in the county of Suffolk and State of Massachusetts, have invented certain new and useful Improvements in Obtaining Cream from Milk; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to improvements in apparatus for separating cream from milk, and it is carried out in the following manner: The milk from which the cream is to be separated is put into a can, preferably of a cylindrical shape, and of greater altitude than diameter. This can is closed in its upper end by means of a hollow float, resting on the surface of the milk in the can, so as to prevent evaporation during the process of raising the cream.

The said can is provided in its upper end with a transparent pane of glass, through which the formation of the cream and its depth can readily be ascertained.

The can is furthermore provided with a hollow tube, rising from near the bottom to about two-thirds of the height of the can, which tube projects through the side of the can near the bottom, where it is provided with a suitable stop-cock. The upper end of said tube is open, and into it is a closely-fitting and vertically-adjustable tube, open at both ends, and having attached to it at its upper end a graduated scale and an index, by which the percentage of cream that is obtained and drawn off through the telescopic tubes is easily ascertained, the index being located behind the transparent-glass frame, so as to show the exact level from which the cream is drawn off. This index is located even with the top of the adjustable telescopic tube, that can be adjusted up and down, so as to draw the cream off from the desired depth.

The milk-can, after being filled with milk, is placed within a water-jacket contained in a chamber. This chamber is surrounded on its sides and bottom with a hollow receptacle, into which steam and cold water are alternately introduced, as follows: When the filled milk-can is put into its place within the water-jacket, I force steam into the receptacle surrounding the chamber containing water until the milk obtains a temperature of about 130° Fahrenheit, at which temperature cream is most readily separated. I now introduce cold water by the force of gravity into the said receptacle, and this cold water I force gradually from the bottom upward, by which the milk, as it is gradually cooled from below, becomes stationary, without any obstructing currents downward that generally exist in milk-cans in which the whole surface is kept at the same temperature and in which evaporation takes place at the top. By preventing such downward currents within the milk-can, the cream is allowed to rise with the utmost freedom and in the quickest time possible, and I am thus enabled to separate a larger percentage of cream in a much quicker time than heretofore has been the case in the ordinary manner.

The disadvantages in raising cream in ordinary open cans are as follows: Evaporation takes place at the top of the milk, which consequently becomes colder than the rest, and consequently heavier, with a tendency to sink downward against the rising cream, which, being thus impeded, is prevented from rising upward, and may even be carried downward into the lower body of the milk, by which two objections arise, namely: first, a less amount of cream is formed than would otherwise have been the case had no such downward currents existed within the can; and, secondly, the necessary time for forming cream is increased on account of the resistance it has to overcome in going upward against the downward currents.

These objections I have entirely overcome, first, in closing the mouth of the milk-can by means of a movable float of a non-conductive nature, by which surface evaporation is in a great degree prevented; secondly, in heating the milk throughout to the temperature most adapted for the raising and formation of cream; and, thirdly, in cooling off the milk from the bottom upward, so as to keep, as it were, each layer of milk in a stationary condition as soon as it has thrown off its cream, and preventing downward currents impeding the upward-rising cream.

After the cream is drawn off downward through the telescopic tubes the milk that remains is found to be in a great degree cured from souring or changing by atmospheric conditions, and this improvement in the milk arises from its having been heated through a water-jacket. Such heating through a water-jacket will not impart any unpleasant taste or flavor to the milk, as is generally the case when milk is directly exposed to live heat.

On the accompanying drawings, Figure 1 represents a central longitudinal section of an apparatus used for carrying out my invention. Fig. 2 represents a horizontal section on the line A B shown in Fig. 1; and Fig. 3 represents a side elevation of the upper portion of my improved milk-can.

Similar letters refer to similar parts wherever they occur on the different parts of the drawings.

$a$ represents the milk-can, with its hollow cover $b$, that may be provided with a downward-projecting annular rim, $b'$, if so desired. $c$ represents the transparent-glass pane in the upper end of said can. $d$ represents the stationary outlet-pipe for the cream, with its valve or cut-off $e$. $f$ represents the adjustable telescopic pipe, fitting inside of the stationary outlet-pipe $d$. $g$ represents the graduated scale, and $h$ is the index, for the purpose set forth.

When the cream is formed I look through the transparent pane $c$, so as to ascertain the depth of cream so formed, and I place the scale $g$, with its index $h$ and tube $f$, in such a position that the upper end of said tube and its index $h$ shall be about on a level with the junction of the cream and milk in the can $a$. The cream will then be allowed to flow out through the pipes $f$ and $d$ as soon as the cock $e$ is opened after the can $a$ has been removed from the receptacle $i$; and it will thus be seen that, when the upper end of the pipe $f$ is located in such a position as described, nothing but cream is drawn off through the tubes $f$ and $d$, the former being made adjustable up and down through the latter and fitting closely within it. The gradations on the scale $g$ will indicate to the operator how many inches of cream is being drawn off, or how large a percentage of cream is drawn off in proportion to the contents of the whole can. $i$ is the water-jacket contained in the vessel $k$. $l$ is the closed receptacle surrounding the vessel $k$. $m$ is an ordinary heater, with its steam-pipe $n$ leading into the hollow receptacle $l$. $o$ is a valve or cut-off on the steam-pipe $n$. $p$ is any ordinary water-cooler, provided with the delivery-pipe $q$, having a valve or cut-off, $r$, as shown. The pipe $q$ is made to enter the hollow receptacle $l$ at its bottom and below the vessel $k$, for the purpose set forth. $s$ is a waste-pipe leading from the lower part of the receptacle $l$, which waste-pipe is provided with a valve or cut-off, $t$, as shown.

What I wish to secure by Letters Patent, and claim, is—

1. The herein-described apparatus for obtaining cream from milk, consisting of the milk-can $a$, the water-jacket $i$, the closed receptacle $l$, the heater $m$, and the cooler $p$, as set forth.

2. The herein-described milk-can $a$, for raising cream, in combination with the telescopic tubes $d f$, the graduated scale $g$, and the indicator $h$, as and for the purpose set forth.

In testimony that I claim the foregoing as my own invention I have affixed my signature in presence of two witnesses.

PHILANDER SHAW.

Witnesses:
ALBAN ANDRÉN,
WILLIS E. FLINT.